United States Patent [19]

Brown

[11] 4,212,909

[45] Jul. 15, 1980

[54] FIREPROOF BARRIER COATING COMPOSITIONS

[75] Inventor: William F. Brown, Wausau, Wis.

[73] Assignee: Wausau Homes, Inc., Wausau, Wis.

[21] Appl. No.: 49,292

[22] Filed: Jun. 18, 1979

Related U.S. Application Data

[62] Division of Ser. No. 949,660, Oct. 10, 1978.

[51] Int. Cl.$^2$ .......................... C08L 61/24; B05D 3/02
[52] U.S. Cl. .......................... 427/393.5; 260/29.4 UA; 260/DIG. 24; 427/393; 428/421; 428/524; 428/528
[58] Field of Search ............... 260/29.4 UA, DIG. 24; 427/385 B, 393; 428/421, 524, 528

[56] References Cited

U.S. PATENT DOCUMENTS

| 4,028,289 | 6/1977 | Brown | 521/117 |
| 4,095,985 | 6/1978 | Brown | 106/15.05 |
| 4,123,575 | 10/1978 | Wesch | 427/386 |

*Primary Examiner*—Michael R. Lusignan
*Attorney, Agent, or Firm*—Michael, Best, & Friedrich

[57] ABSTRACT

A composition for coating the surface of a substrate, particularly structural members, and providing thereon an adherent, fireproof barrier coating including an aqueous dispersion containing vinyl acetate, titanium dioxide, pumice, zinc oxide, sodium silicate, hydrated magnesium aluminum silicate, a comminuted high temperature fluorocarbon resin, a furan resin, comminuted charcoal, and a dispersing agent.

4 Claims, No Drawings

FIREPROOF BARRIER COATING COMPOSITIONS

CROSS REFERENCE TO RELATED APPLICATIONS

This is a division of application Ser. No. 949,660, filed Oct. 10, 1978.

BACKGROUND OF THE INVENTION

This invention relates to coating compositions and, more particularly, to coating compositions for fireproofing structural substrates, such as building walls and the like.

There is a well-recognized need for low cost coating compositions which can be applied to surface of structural members including dry wall paneling and synthetic polymeric structural materials, such as Styrofoam and polyurethane, to provide a fireproof barrier coating which is capable of adhering to the surface of the substrate throughout the entire spectrum of anticipated environmental conditions during normal use and a fire. Such a coating composition desirably should be capable of convenient formulation from inexpensive materials and being applied to the substrate in a convenient manner. Also, in order to be safe and effective for a variety of applications, the coating composition should provide a fireproof barrier having the following basic characteristics: (1) high resistance to moisture permeation so as to prevent moisture from migrating to and collecting at the interface between the barrier coating and the substrate, (2) emit very little or no smoke and no appreciable amount of toxic vapors when exposed to open flame and/or elevated temperatures up to 1400° F. and higher, (3) tenaciously adhere to the substrate surface without peeling or cracking when exposed to temperatures ranging from sub-freezing up to 1400° F., or higher, (4) high heat reflectivity so as to minimize the amount of heat allowed to permeate to the substrate, and (5) sufficient hardness to prevent punctures under normal usage conditions. Desirable secondary characteristics include (6) resistance to deterioration by ultraviolet light, (7) resistance to organic solvents, acids and alkaline materials, (8) provide an attractive, decorative finish, (9) ability to completely cover or "hide" substrate surface, and (10) capable of being painted with various types of decorative paints without losing its heat reflectivity and other fireproofing properties.

Prior art coating compositions containing inorganic fire resistant substances typically also include substantial amounts of organic binders, such as asphalt or synthetic polymers, to enhance adhesion of the resultant coating to the substrate. Such organic materials often are quite expensive and/or detract from the fireproofing characteristics of the resultant barrier coating. The coating composition disclosed in my U.S. Pat. No. 4,095,985 issued on June 20, 1978 does not have many of the shortcomings of other prior art compositions because it does not contain organic substances. However, the resultant barrier coating tends to check or crack at elevated temperatures, is vulnerable to attack by solvents, acids and alkaline materials, and tends to allow heat to permeate to the substrate surface.

SUMMARY OF THE INVENTION

A principal object of the invention is to provide a relatively inexpensive coating composition which can be applied to a variety of substrates and is capable of providing a fireproof barrier coating having the above-noted basic characteristics.

Another object of the invention is to provide such a coating composition also having the above-noted secondary characteristics.

A further object of the invention is to provide such a coating composition which can be applied to the substrate by a variety of convenient techniques.

Other objects and advantages of the invention will become apparent to those skilled in the art upon reviewing the following detailed description and appended claims.

The coating composition of the invention comprises an aqueous dispersion containing vinyl acetate, titanium dioxide, pumice, zinc oxide, sodium silicate, hydrated magnesium aluminum silicate, a high temperature fluorocarbon resin, a furan resin, charcoal, and a dispersing agent.

The fireproof barrier coating provided by the coating composition of the invention has all of the eleven characteristics mentioned above which is highly unique for coating compositions of this type. The ingredients of the coating composition are all well known and some have been employed as fireproofing coating compositions. However, it has been found that the coating composition must include all of the above-noted ingredients in order to provide a fireproof barrier coating having all these characteristics and omission of any of the ingredients results in some degradation or elimination in one or more of the desirable characteristics.

DESCRIPTION OF THE PREFERRED EMBODIMENTS

While the coating composition can include different amounts of various ingredients, the preferred formulation is as follows:

| INGREDIENT | PERCENT OF TOTAL WEIGHT |
| --- | --- |
| Vinyl acetate | about 2 to about 6 |
| Titanium dioxide | about 3 to about 9 |
| Pumice | about 7 to about 22 |
| Zinc oxide | about 3 to about 9 |
| Sodium silicate (aqueous solution-40% $Na_2Si_3O_7$) | about 10 to about 25 |
| Hydrated magnesium aluminum silicate | about 2 to about 7 |
| Comminuted fluorocarbon resin (high temperature) | about 3 to about 9 |
| Furan resin | about 5 to about 20 |
| Comminuted charcoal | about 7 to about 20 |
| Dispersing agent | about 2 to about 7 |

The total effect of each ingredient in the overall combination and its interrelationship with the other ingredients are not completely understood; however, the following observations have been made.

Vinyl acetate serves primarily as a binding agent and also facilitates the formation of a homogeneous dispersion of the ingredient. It preferably is added as a solution (e.g. 40% solution). Many commercially available vinyl acetate solutions, such as Niacet supplied by Union Carbide, can be used.

Titanium dioxide serves primarily as a high temperature-resistant filler and pigment (white). Since titanium dioxide can withstand temperatures in excess of 1400° F. without shrinking, it also assists in preventing cracking of the barrier coating when heated to temperatures up to 1399° F. in accordance with standard temperature and time curves. Rutile titanium dioxide, such as Titanox 2030 supplied by N. L. Industries, Inc., is particularly preferred because of its high resistance to heat and high heat reflectivity.

The titanium dioxide should have particle size sufficiently small to facilitate uniform dispersion throughout the coating composition. Also, smaller particles produce less shrinkage. Generally, the particle size of the titanium dioxide should be about 280 to about 360 screen mesh and best results are obtained with a particle size of about 320 screen mesh.

Pumice is a naturally occurring gray powder of vulcanic origin and consists mainly of complex silicates of aluminum, potassium and sodium. Pumice generally can withstand higher heats than titanium dioxides and serves as a high temperature-resistant filler. In addition to imparting fireproofing and insulating properties, the pumice serves to make the resultant barrier coating heat reflective, rather than heat refractive, and also serves as a carrier or vehicle for facilitating application of the coating by spraying.

To best perform these functions, the pumice should be finely comminuted in the order of 10 microns or less. In a preferred embodiment, a mixture of three different grades of pumice is used, one grade being 220 screen mesh, another being 300 screen mesh, and the other being 4-7 microns.

Titanium dioxide tends to chalk upon exposure to ultraviolet light and ordinary weathering. The zinc oxide masks the titanium dioxide and other ingredients from degradation by ultraviolet light. While zinc oxide can easily withstand temperatures as high as 1200°-1400° F. without decomposition, it does tend to glow at such elevated temperatures. For this reason, amounts of zinc oxide in excess of about 9 weight % preferably should be avoided.

The sodium silicate, which preferably is used in the form of commercially available solutions (e.g., aqueous solutions containing 40% $Na_2Si_3O_7$, such as Du Pont's JM), serves primarily as a binding agent to improve adherence of the barrier coating to the substrate. It also enhances the flame and moisture resistance of the resultant barrier coating.

Amounts of sodium silicate in excess of about 25 weight % tends to cause formation of large bubbles and resultant cracking when exposed to temperatures of about 1200°-1450° F.

The hydrated magnesium aluminum silicate serves primarily as a thixotropic agent for making the coating compositions sufficiently viscous to facilitate application of a reasonably thick layer on vertical or inverted horizontal surfaces without running and yet fluid enough, upon application of shearing forces (e.g., agitation, shaking, or otherwise disturbing), to permit convenient application by brushing, rolling, spraying, troweling and the like. The hydrated magnesium aluminum silicate is also flame resistant and improves the hardness, and thus the puncture resistance, of the resultant barrier coating. Amounts of the hydrated magnesium aluminum silicate in excess of about 7 weight % tend to produce an undesirably highly fluffy texture.

The high temperature fluorocarbon resin serves primarily to make the resultant barrier coating resistant to attack by organic solvents, such as acetone, ethylene chloride, gasoline, etc., acids, and alkaline materials and resistant to stress cracking upon exposure to mechanical forces and high temperatures. Suitable fluorocarbon resins include polytetrafluoroehtylene, such as Teflon TFE, supplied by E. I. Du Pont, fluorinated ethylene-propylene, such as Teflon FEP, supplied by E. I. Du Pont, polychlorotrifluoroethylene, such as KEL-F 81 supplied by 3M Company, and polyvinylidine fluoride, such as Kynar supplied by Pennsalt Chemical Corp. Polytetrafluorethylene presently is the preferred fluorocarbon resin.

In order to prevent excessive migration to the surface of the resultant coating, finely comminuted particles of the fluorocarbon resin in the order of 5 to 7 microns are preferred. Reground non-virgin material is particularly preferred because of its low cost. The fluorocarbon resin tends to decompose and release carbon at about 700° to about 800° F. so amounts in excess of about 9 weight % preferably should be avoided.

The furan resin, which can withstand temperatures as high as 1800°-2800° F. without emitting smoke, serves to stabilize the dispersion. It also serves as a bactericide and improves the resistance of the barrier coating to ultraviolet light and moisture. It further serves somewhat like a frothing agent during mixing tending to form the vinyl acetate into microspheres or bubbles which further enhances the insulation properties of the resultant barrier coating.

Suitable furan resins include the furfuryl alcohol, furfuryl alcohol formaldehyde, and furfuryl alcohol-urea-formaldehyde types. The latter type adapted for use as foundry core binders presently is preferred. These furan resins commonly are supplied as liquids in two separate containers, one including a catalyst for accelerating the complete curing of the partially cured or B-stage resin in the other container.

The charcoal decomposes upon exposure of the barrier coating to temperatures of about 1200°-1400° F. and forms carbon dioxide gas. This evolution of gases produces voids or dead spaces in the coating which creates an additional insulative effect between the substrate and surface of the coating in the event of a fire.

The particle size of the charcoal generally should be about 300 to about 325 screen mesh, in order to facilitate uniform dispersion during mixing and to minimize undesirable protrusion of the particles from the coating surface.

The dispersing agent, which preferably is anionic or nonionic, serves to form a stable dispersion or suspension of the water insoluble ingredients in the aqueous phase. Various conventional dispersing agents commonly used in latex paints and similar water-based coating compositions for dispersing insoluble polymers, pigments, and the like can be used. Suitable commercially available dispersing agents include Triton X-100 and Tamol 731 supplied by Rohm & Haas.

A coating composition particularly adaptable for use as a firproof barrier coating for gypsum wall board has the following formulation:

| INGREDIENT | PERCENT OF TOTAL WEIGHT |
| --- | --- |
| Vinyl acetate (40% solution) | 9 |
| Titanium dioxide (rutile) | 7 |
| Pumice | 13 |
| Zinc oxide | 4 |
| Sodium silicate (40% solution) | 20 |
| Hydrated magnesium aluminum silicate | 3 |
| Comminuted polytetrafluoroethylene | 5 |
| Furan resin | 9 |
| Comminuted charcoal | 10 |
| Dispersing agent | 5 |
| Water | 15 |

| INGREDIENT | PERCENT OF TOTAL WEIGHT |
|---|---|
| -continued | |
| | 100 |

The coating composition can be prepared by any suitable procedure whereby the ingredients are uniformly dispersed throughout. In a preferred procedure, all the liquid ingredients, including the vinyl acetate solution, sodium silicate solution, liquid furan resin, dispersing agent and water, are added to the high speed blender, such as a Cowls blender or equivalent, and mixed at a blender speed in the order of 1800 rpm for about 5 to about 15 minutes to produce a relatively viscous froth, e.g., about 4,000 centipoises. The solid ingredients, including the titanium dioxide, pumice, zinc oxide, hydrated magnesium aluminum silicate, fluorocarbon resin and charcoal, are added to the pre-blended liquid ingredients and mixing is continued for another 30 minutes to 3 hours. The charcoal preferably is added last.

The resultant dispersion or suspension usually heats up to about 200° F. during mixing. After cooling the coating composition is ready for application.

Incorporation of air bubbles into the coating composition tends to improve the insulation characteristics of the resultant barrier coating. Some air can be "beat" into the mixture by using an open vat and high mixing blade speeds. Additional air bubbles preferably are incorporated into the mixture by injecting pressurized air thereinto (e.g., 80 psig) for time intervals of about 2-15 seconds during the preblending stage and/or the final mixing stage.

The consistency of the coating composition can be varied from a paint-like consistency to a plaster-like consistency for the desired method of application by varying the water content. As mentioned above, the coating composition can be applied to the surface of the substrate to be protected by brushing, rolling, troweling, spraying, and other suitable techniques. When the coating composition is sprayed, the resultant barrier coating includes higher amounts of encapsulated air bubbles which enhances the insulative properties. Accordingly, spraying is the preferred technique of application when fireproofing is the primary consideration. On the other hand, when the coating composition is supplied by brushing, rolling or troweling, the resultant barrier coating is considerably harder which may be desirable for some applications.

Generally, a coating thickness of about 30 to about 50 mils provides an acceptable fireproof barrier coating. There is some expansion of the coating composition after application so the resultant barrier coating usually is about 20-23% thicker than the original layer of coating composition at the time of the application.

The coating composition has thixotropic-like characteristics which are particularly desirable for application with a paint roller or similar applicator. After a paint roller is dipped into the composition, it partially solidifies or "freezes" on the roller almost immediately after the roller is withdrawn and there is virtually no dripping during rolling. It has been found that a sufficient amount of the coating composition can be retained in a conventional high nap paint roller (2-inch diameter and 12 inch length), which is submerged into a coating composition, to completely cover a 4 foot by 8 foot panel of gypsum wall board without dripping.

Ice crystals do not form in the coating composition until it reaches a temperature of about $-10°$ F. and, in the event of freezing, the coating composition is completely acceptable for use after thawing. The coating composition can be applied at surface and/or ambient temperatures as low as 0° F. The coating composition dries to its hardened state in about 48 to about 72 hours.

The resultant fireproof barrier coating does not become active until exposed to flame or heated to a temperature of about 500° F. and, at a temperature of about 550°-800° F., starts to bubble without cracking or peeling, thereby creating dead spaces or voids which provide increased insulative protection for the underlying structure. The barrier coating does not support combustion even though subjected to open flame at temperatures in excess of 1400° F. and can withstand considerable flexing of the underlying substrate without cracking or peeling. The barrier coating typically has a Barcol hardness on the D scale of 90–98 and has been found to become even harder when exposed to heat or open flame. The barrier coating can be heated to temperatures in excess of 1400° F. without emitting any smoke or toxic vapors and is highly resistant to permeation by moisture. The barrier coating has a non-chalking, decorative finish which is resistant to ultraviolet light and can be painted with latex, acrylic or oil paints (up to about 55 mils thick) without adversely affecting its desirable properties as a fireproof barrier.

Without further elaboration, it is believed that one skilled in the art can, using the preceding description, utilize the present invention to its fullest extent. The following examples are presented to exemplify preferred embodiments of the invention and should not be construed as limitations thereof.

EXAMPLE I

A coating composition was prepared in accordance with the following formulation:

| INGREDIENT | WEIGHT |
|---|---|
| Vinyl acetate (40% solution)[1] | 9 |
| Titanium dioxide (rutile) | 7 |
| Pumice | 13 |
| Zinc oxide | 4 |
| Sodium silicate[2] (aqueous solution-40% $Na_2Si_3O_7$) | 20 |
| Hydrated magnesium aluminum silicate | 3 |
| Comminuted polytetrafluoroethylene[3] | 5 |
| Furan resin[4] | 9 |
| Comminuted charcoal | 10 |
| Dispersing agent[5] | 5 |
| Water | 15 |
| | 100 |

Notes:
[1] Niacet supplied by Union Carbide.
[2] Du Pont JM
[3] Reground, non-virgin material (5 micron) supplied by Allied Chemical Corp.
[4] Foundry core binder type supplied by M & T Chemicals, Inc.
[5] Triton X-100 supplied by Rohm & Haas.

All the liquid ingredients, including water, were added to a high-speed Cowls blender having a 468 gallon tank and a 14-inch high dispersion blade and mixed at a speed of about 1800 rpm for approximately 5 minutes to form a frothing mixture. The solid ingredients were slowly added (charcoal added last) to the preblended liquids with the dispersion blade operating and blending continued for approximately 2 hours after all the ingredients had been added.

EXAMPLE II

The coating composition of Example I was applied to polyurethane foam and the coated foam was subjected to a full scale corner burn test to determine the capability of the resultant coating as a fireproof barrier. In the test, a coating having a nominal wet thickness of 35 mils was applied to the walls and ceiling of a test cell constructed in accordance with Section V-Al of the "Proposed Criteria For Foam Plastics under Section 1717 of the 1976 Uniform Building Code". The closed end of the wall, the ceiling and a side wall of the test cell were previously coated with 1½ inches of polyurethane foam. The coating composition was applied with a rotary spray gun employing 80 psi air pressure. After the coating had cured for approximately 48 hours, two 5-inch square plugs were removed from the surface of the end wall, ceiling and side wall and the mean thickness of the coating was 0.038 inch.

A 30 pound fuel crib was constructed in the corner of the test cell formed by the junction of the polyurethane foam coated sidewall and end wall. The fuel crib was ignited and allowed to burn for 15 minutes. The temperature of the exposed surfaces of the end wall, the ceiling and the sidewalls were measured and found to be as high as 1640° F. during the burn test. Following the burn test, the interior of the test cell and the underlying foam were examined. The barrier coating did not have any cracks and showed no evidence of supporting combustion or peeling. It was the opinion of an impartial engineer who conducted the test that the coating completely protected the polyurethane foam against fire damage.

EXAMPLE III 1 ft.×2 ft.×3 in. samples of Styrofoam and expanded polystyrene (EPS) were coated on all four sides with a 30–50 mil thick layer of the coating composition of Example I. After curing for approximately 48 hours, the coated samples were placed in a radiant heat oven and heated from 0°–1900° F. in 15 minutes. The coating did not support combustion and remained in place without cracking even though the Styrofoam and EPS disintegrated into a jelly-like substance.

Similar tests were run on completely coated samples of wood (2 in. ×4 in.) and polyurethane. Even though there was some charring of the underlying wood and polyurethane, the coating did not support combustion, remained substantially intact, and did not crack.

EXAMPLE IV

To further demonstrate the fireproofing properties of the barrier coating provided by the coating composition of the invention, a ⅜ inch Upson wallboard (fiber board) was coated on one side with a 35 mil layer of the coating composition of Example I. After curing for approximately 48 hours, the wallboard was flexed and the barrier coating did not crack or peel. The blue flame of a blow torch was then applied directly to the coating for approximately 5 minutes. The coating retained its original white color and the underlying wallboard showed no evidence of fire damage and retained its original structural integrity: Similar results were obtained with ½ inch gypsum wallboard.

EXAMPLE V

A 45–55 mil layer of the coating composition of Example I was applied to a smooth cement block wall. After curing for approximately 48 hours, random samples of the coating were taken to determine the thickness. It was found that the coating had a thickness of approximately 54–68 mils indicating that the coating expands during curing to provide additional insulation.

The blue flame of the blow torch was applied directly to the coating for approximately 5 minutes. Although the coating exhibited some bubbling, it did not crack or peel from the surface of the cement blocks, did not support combustion and did not show any evidence of burning.

EXAMPLE VI

Samples of a variety of materials, including wood, Styrofoam, and polyurethane foam were completely coated with a 30–50 mil layer of the coating composition of Example I. After curing for at least 48 hours, the samples were weighed, immersed in water for 24 hours and then weighed to determine the amount of water absorption. In all cases, the water absorption was less than 0.5% by weight.

From these test results, it can be seen that the coating composition of the invention is capable of providing a highly adherent, moisture resistant, fireproof barrier coating for a variety of substrates. It can also be seen that the barrier coating has high heat reflectivity and is capable of maintaining its structural integrity even though the underlying support is partially disintegrated by extremely high heat.

From the foregoing description, one skilled in the art can easily ascertain the essential characteristics of the invention and, without departing from the spirit and scope thereof, can make various changes and modifications to adapt it to various usages and conditions.

I claim:

1. A method for fireproofing a flammable substrate comprising the steps of applying to the exposable surfaces of the substrate a continuous coating of a composition comprising an aqueous dispersion containing vinyl acetate, titanium dioxide, pumice, zinc oxide, sodium silicate, hydrated magnesium aluminum silicate, a comminuted high temperature fluorocarbon resin, a furan resin, comminuted charcoal, and a dispersing agent, and allowing said coating to cure to a hardened state.

2. A method according to claim 1 wherein the thickness of said coating at the time of application is about 30 to about 50 mils.

3. A method according to claim 2 wherein said aqueous dispersion contains about 2 to about 6 weight % vinyl acetate, about 3 to about 9 weight % titanium dioxide, about 7 to about 22 weight % pumice, about 3 to about 9 weight % zinc oxide, about 10 to about 25 weight % of a 40% aqueous solution of sodium silicate, about 2 to about 7 weight % hydrated magnesium aluminum silicate, about 3 to about 9 weight % of the fluorocarbon resin, about 5 to about 20 weight % of the furan resin, and about 2 to about 7 weight % of the dispersing agent, all based on the total weight of said aqueous dispersion.

4. A method according to claim 3 wherein said aqueous dispersion contains about 9 weight % of a 40% solution of vinyl acetate, about 7 weight % rutile titanium oxide, about 13 weight % pumice, about 4 weight % zinc oxide, about 20 weight % of the sodium silicate solution, about 3 weight % hydrated magnesium aluminum silicate, about 5 weight % polytetrafluoroethylene, about 9 weight % of the furan resin, about 10 weight % charcoal and about 5 weight % of the dispersing agent.

* * * * *